A. KIELLAND.
ARRANGEMENT OF BRANCH PORTIONS, &c., FOR WOODEN STAVE PIPES.
APPLICATION FILED OCT. 20, 1919.
1,325,990.
Patented Dec. 23, 1919.
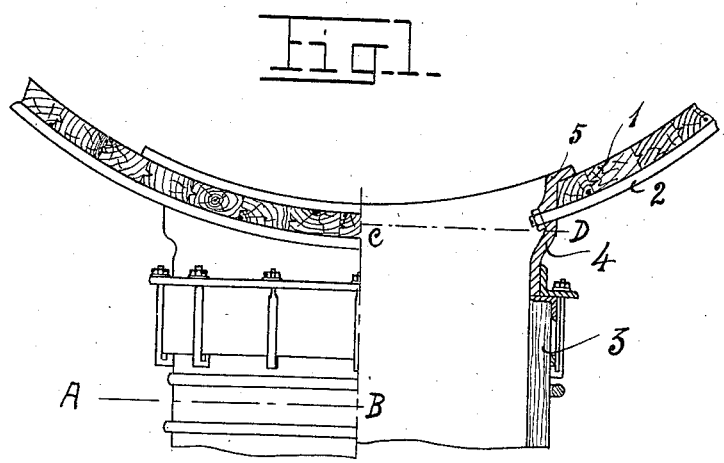
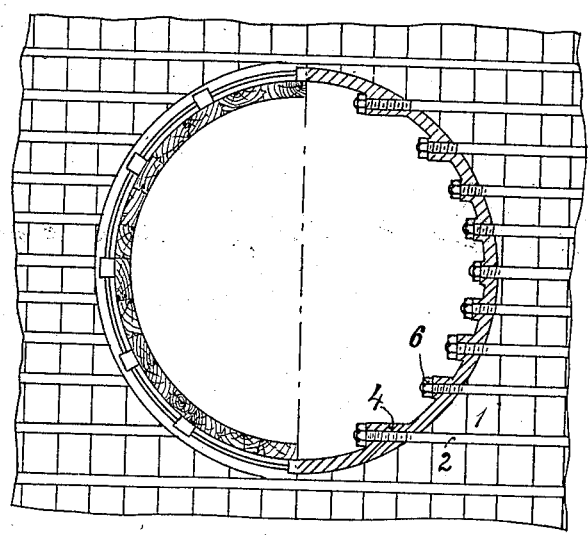
INVENTOR
ALFRED KIELLAND
BY
HIS ATTORNEY

UNITED STATES PATENT OFFICE.

ALFRED KIELLAND, OF TRONDHJEM, NORWAY, ASSIGNOR TO A/S. NORSK TRAEROR KOMPANI, OF TRONDHJEM, NORWAY.

ARRANGEMENT OF BRANCH PORTIONS, &c., FOR WOODEN-STAVE PIPES.

1,325,990.   Specification of Letters Patent.   Patented Dec. 23, 1919.

Application filed October 20, 1919. Serial No. 331,855.

*To all whom it may concern:*

Be it known that I, ALFRED KIELLAND, a subject of the King of Norway, residing at Trondhjem, Norway, have invented certain new and useful Improvements in Arrangements of Branch Portions, &c., for Wooden-Stave Pipes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to wooden stave pipes and has for its object a special arrangement of the connecting means between a wooden stave pipe and a branch pipe or the like, for instance a man-hole, water tower, etc.

The purpose of the invention is to maintain the reinforcing bands in engagement with the wooden staves in their entire length, which is obtained also at the part of the pipe in which the branch piece is connected to the main pipe. This purpose is fulfilled in accordance with the present invention by this that the ends of the reinforcing bands which are interrupted by the branch piece or the like are passed through the wall of the latter and attached to the inside of the same. The invention is particularly applicable in connection with a pipe fitting of iron, forming the connecting member between the main pipe and the branch member; but of course it can be utilized also in connection with other branch constructions.

In the drawing a constructional form of the invention is illustrated.

Figure 1 is a cross section partly in elevation of the branch portion and

Fig. 2 is at the left hand side a section on the line A—B of Fig. 1 and at the right hand side a section on the line C—D of Fig. 1.

1 is the wooden stave pipe and 2 is reinforcing bands or rings; 3 is a branch pipe which is joined to the wooden stave pipe by means of the cast iron pipe fitting 4. The latter is provided with a flange 5, engaging the inner side of an opening made in the wooden stave pipe. The reinforcing bands 2 of the wooden stave pipe are passed through the wall into the inside of the pipe fitting 4 and are attached by means of threads and nuts 6. In this manner the reinforcing bands are throughout their lengths clamped fast against the wooden staves of the pipe 1 and at the same time the flange 5 is pressed into engagement with the inside of the pipe.

Claims:—

1. In wooden stave pipes provided with branch portions, manholes, etc., the combination with the pipe proper of reinforcing bands, the bands which are interrupted by said branch portions, manholes, etc., being passed through the wall of the latter and attached to the inside of the same.

2. In wooden stave pipes provided with branch portions, manholes, etc., the combination with the pipe proper of reinforcing bands, a branch portion, manhole-frame, etc., passed through an opening made in the wooden stave pipe, a flange arranged upon the inner end of said branch portion, etc., and being in engagement with the inside of the wooden stave pipe, the bands which are interrupted by said branch portion, etc., being passed through the wall of the latter and attached to the inside of the same, whereby the wooden staves are clamped fast between this flange and the reinforcing bands.

In testimony that I claim the foregoing as my invention, I have signed my name in presence of two subscribing witnesses.

ALFRED KIELLAND.

Witnesses:
ELISE POULSSAU,
JOHANNE BRUN.